United States Patent
Diana et al.

(10) Patent No.: US 6,874,534 B2
(45) Date of Patent: Apr. 5, 2005

(54) MODULAR FLUID PRESSURE REGULATOR WITH BYPASS

(75) Inventors: Michael J. Diana, Orion, MI (US); David L. Hamilton, South Lyon, MI (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 10/770,366

(22) Filed: Feb. 2, 2004

(65) Prior Publication Data

US 2004/0154675 A1 Aug. 12, 2004

Related U.S. Application Data

(62) Division of application No. 10/021,467, filed on Oct. 30, 2001.

(51) Int. Cl.[7] ............................................. F16K 11/10
(52) U.S. Cl. .................................. 137/599.11; 137/884
(58) Field of Search .......................... 137/510, 599.09, 137/599.11, 599.14, 240, 601.13, 884

(56) References Cited

U.S. PATENT DOCUMENTS

| | | |
|---|---|---|
| 2,583,664 A | 1/1952 | Oldham et al. |
| 2,806,481 A | 9/1957 | Faust |
| 3,045,691 A | 7/1962 | Young |
| 3,053,461 A | 9/1962 | Inglis |
| 3,150,675 A | 9/1964 | Phillips |
| 3,326,228 A | 6/1967 | Phillips |
| 3,433,262 A | 3/1969 | Ray |
| 3,828,807 A | 8/1974 | Dawes |
| 4,148,932 A | 4/1979 | Tada et al. |
| 4,230,143 A * | 10/1980 | Dettmann et al. .......... 137/270 |
| 4,311,724 A | 1/1982 | Scharfenberger |
| 4,348,425 A | 9/1982 | Scharfenberger |
| 4,362,124 A | 12/1982 | Fleig |
| 4,400,147 A | 8/1983 | Springer et al. |
| 4,534,717 A | 8/1985 | McCabe |
| RE32,151 E | 5/1986 | Scharfenberger |
| 4,592,305 A | 6/1986 | Scharfenberger |
| 4,660,597 A | 4/1987 | Cowles |
| 4,828,218 A | 5/1989 | Medlock |
| 4,953,403 A | 9/1990 | Springer |
| 5,967,489 A | 10/1999 | Nakazawa et al. |
| 6,283,143 B1 | 9/2001 | Adachi, Jr. et al. |
| 6,394,138 B1 | 5/2002 | Vu et al. |
| 6,450,200 B1 | 9/2002 | Ollivier |

FOREIGN PATENT DOCUMENTS

| | | |
|---|---|---|
| DE | 100 29 928 A 1 | 1/2002 |
| EP | 1084760 | 3/2001 |

OTHER PUBLICATIONS

ITW Ransburg, Electrostatic Systems, "MCV Series Modular Color Changer", Model(s): 78011–XX, 2001.

* cited by examiner

*Primary Examiner*—John Fox
(74) *Attorney, Agent, or Firm*—Barnes & Thornburg

(57) ABSTRACT

A fluid pressure regulator assembly includes a body having a first passageway extending from a first port to a second port, and a second passageway extending from a third port to a fourth port. A pressure regulator is coupled between the second and third ports for controlling the pressure of fluid flowing from the second port to the third port. The regulator assembly further includes a bypass valve and the body includes a housing for the bypass valve. A third passageway extends from the first passageway to the housing, and a fourth passageway extends from the housing to the second passageway. The bypass valve controls flow from the first passageway through the third passageway and the fourth passageway to the second passageway in response to a bypass control signal coupled to the bypass valve.

8 Claims, 3 Drawing Sheets

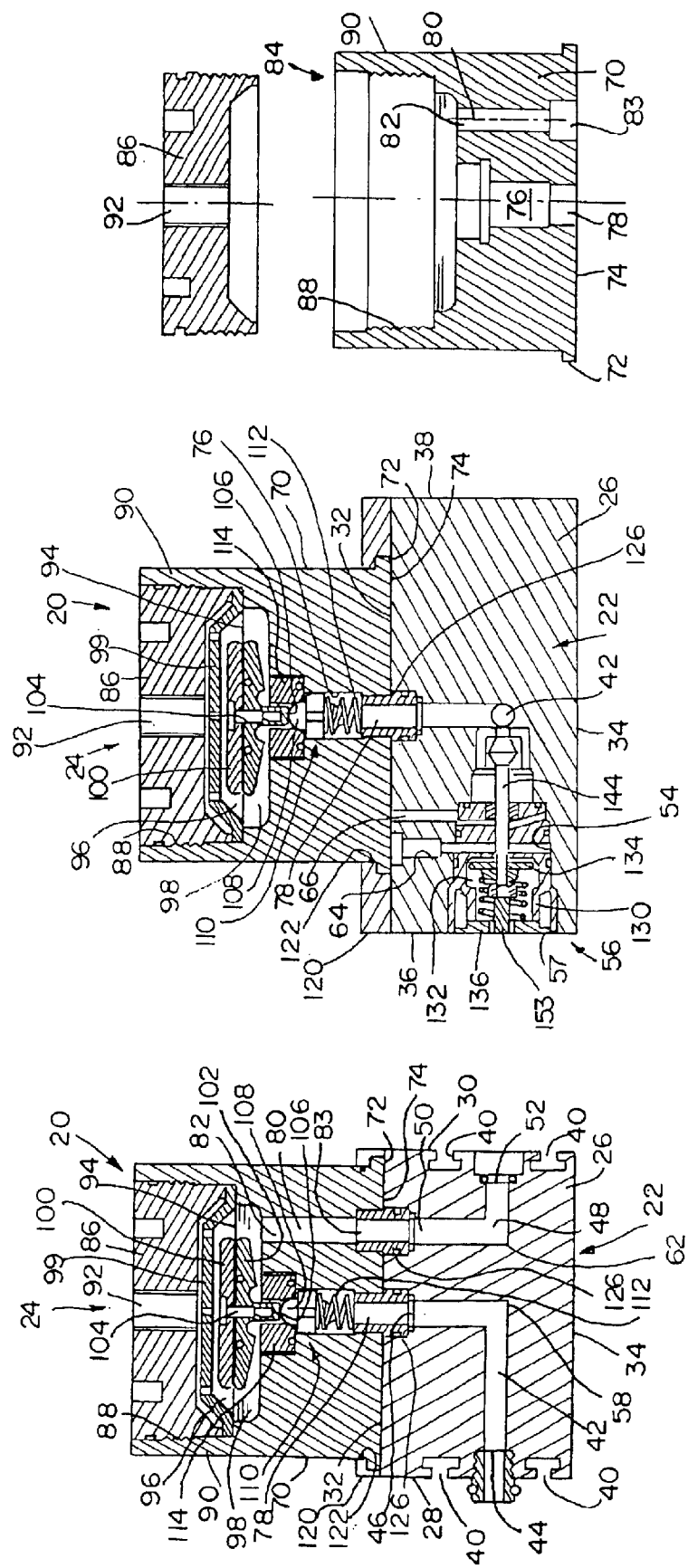

MODULAR FLUID PRESSURE REGULATOR WITH BYPASS

This application is a division of U.S. Ser. No. 10/021,467, filed Oct. 30, 2001, titled Modular Fluid Pressure Regulator With Bypass, assigned to the same assignee as this application.

FIELD OF THE INVENTION

This invention relates to systems for regulating fluid pressure. It is disclosed in the context of a fluid pressure regulator for a system for dispensing fluid coating materials, but is believed to be useful in other applications as well.

BACKGROUND OF THE INVENTION

Fluid pressure regulator assemblies for automotive and industrial coating material dispensing systems are known. There are, for example, the systems illustrated and described in U.S. Pat. Nos. Re. 32,151; 2,583,664; 2,806,481; 3,045,691; 3,053,461; 3,150,675; 3,326,228; 3,433,262; 3,828,807; 4,148,932; 4,311,724; 4,348,425; 4,362,124; 4,592,305; 4,660,597; and, 4,828,218. The disclosures of these patents are hereby incorporated herein by reference. No representation is intended by this listing that a complete search of all relevant prior art has been conducted, or that there are no better references than the above listed patents, or that any of the above listed patents is material to patentability. Nor should any such representation be inferred.

Typically, whenever it is necessary or desirable to flush the fluid supply lines to and from such a fluid pressure regulator, the control fluid pressure, for example, compressed air pressure, supplied to a control port of the regulator is increased substantially, increasing the pressure of the flushing fluid, typically, a solvent, used to flush the fluid supply lines. This occurs in an industrial or automotive coating material dispensing setting, for example, when it is desirable to change the color or type of the coating material being dispensed through the fluid pressure regulator. Increasing the pressure of the solvent flowing through the lines increases the speed with which the circuit between a supply of the solvent and a device which dispenses the fluid whose pressure is being regulated is purged and cleaned and readied for dispensing of another fluid whose pressure is to be regulated, for example, a coating material of another color or type. This, in turn, shortens the color change cycle between times when articles stop being coated with a pre-color change color and begin being coated with a post-color change color.

After several color change cycles, the components of the regulator deteriorate and the regulator needs to be serviced. The time between servicings could be extended if it were not necessary to subject the regulator to such high control fluid pressure to get the necessary solvent flow through the fluid supply lines and regulator during solvent flushing.

DISCLOSURE OF THE INVENTION

According to one aspect of the invention, a fluid pressure regulator assembly includes a body having a first surface and a second surface generally parallel to the first surface, and a third surface generally perpendicular to the first and second surfaces. A first passageway extends from a first port provided in the first surface to a second port provided in the third surface. A second passageway extends from a third port provided in the third surface to a fourth port provided in the second surface. A pressure regulator includes a fifth control port for receiving a fluid pressure signal, a sixth port in fluid communication with the second port and a seventh port in fluid communication with the third port to control the pressure of fluid flowing from the second port to the third port, thereby controlling the pressure of fluid flowing from the first port to the fourth port.

Illustratively according to this aspect of the invention, the body is generally right rectangular prism shaped.

Further illustratively according to this aspect of the invention, the first passageway includes a generally right angle turn.

Additionally illustratively according to this aspect of the invention, the second passageway includes a generally right angle turn.

Illustratively according to this aspect of the invention, the second passageway includes a generally right angle turn.

Further illustratively according to this aspect of the invention, the fluid pressure regulator includes a bypass valve. The body includes a housing for the bypass valve. A third passageway extends from the first passageway to the housing, and a fourth passageway extends from the housing to the second passageway. The bypass valve controls flow from the first passageway through the third passageway and the fourth passageway to the second passageway in response to a bypass control signal coupled to the bypass valve.

Additionally illustratively according to this aspect of the invention, the body includes a fifth passageway extending from the housing to one of the first, second and third surfaces.

Illustratively according to this aspect of the invention, the bypass valve includes a movable valve member and a seat. The movable member and seat have a first relative orientation to close the bypass valve and a second relative orientation to open the bypass valve. The apparatus further includes an indicator coupled to the movable member and visible when the movable member is in one of the first and second orientations to indicate the condition of the bypass valve.

Further illustratively according to this aspect of the invention, the fluid regulator includes a first component for providing a flow of fluid to the fluid pressure regulator assembly and a second component for receiving a flow of fluid from the fluid pressure regulator assembly. The first component includes an output port having a complementary configuration to the first port and the second component includes an input port having a complementary configuration to the fourth port. The fluid regulator further includes means for maintaining the first component and the pressure regulator assembly in an orientation in which the output port and the first port are coupled in fluid tight engagement, and the second component and the pressure regulator assembly in an orientation in which the input port and the fourth port are coupled in fluid tight engagement.

According to another aspect of the invention, a fluid pressure regulator assembly includes a body having a first passageway extending from a first port to a second port, and a second passageway extending from a third port to a fourth port. A pressure regulator is coupled between the second and third ports for controlling the pressure of fluid flowing from the second port to the third port. The regulator assembly further includes a bypass valve and the body includes a housing for the bypass valve. A third passageway extends from the first passageway to the housing, and a fourth passageway extends from the housing to the second passageway. The bypass valve controls flow from the first passageway through the third passageway and the fourth passageway to the second passageway in response to a bypass control signal coupled to the bypass valve.

According to another aspect of the invention, a fluid regulating assembly includes an assembly body providing a fluid entry passageway and a fluid exit passageway, a bypass valve communicating with the fluid entry and exit passageways, and a regulator-mounting portion including a fluid entry passageway exit port and a fluid exit passageway entry port. A fluid regulator includes a regulator body defining an internal chamber having a diaphragm separating the chamber into a regulating fluid portion and a regulated fluid portion. The regulator body has a regulating fluid port in communication with the regulating fluid portion to receive a regulating fluid pressure signal. The regulator body has a regulated fluid inlet and a regulated fluid outlet in communication with the regulated fluid portion. The regulating fluid inlet is coupled with a source of regulating fluid. The regulated fluid inlet is coupled to the fluid entry passageway and the regulated fluid outlet is coupled to the fluid exit passageway.

Illustratively according to this aspect of the invention, the bypass valve has a first orientation in which it blocks fluid flow from the fluid entry passageway to the fluid exit passageway and a second orientation in which it does not block fluid flow from the fluid entry passageway to the fluid exit passageway.

Additionally illustratively according to this aspect of the invention, the bypass valve is coupled to a bypass signal source to receive from the bypass signal source a bypass signal to move the valve between the first and second orientations.

Further illustratively according to this aspect of the invention, the fluid regulating assembly includes a seal to prevent fluid flow around the bypass valve and a vent passageway extending between a surface of the assembly body and the bypass valve to indicate when the seal is leaking.

According to a further aspect of the invention, a bypass structure is provided for a fluid pressure regulator of the type having a regulator inlet port and a regulator outlet port communicating in the regulator. The bypass structure includes a body having a fluid entry passageway, a fluid exit passageway, and a bypass passageway extending between the entry and exit passageways. A bypass valve is positioned in the bypass passageway and is movable between a first position to block fluid flow through the bypass passageway and a second position permitting fluid flow through the bypass passageway.

Illustratively according to this aspect of the invention, the bypass structure includes a control signal passageway in communication with the bypass valve. A bypass signal source is coupled to the control signal passageway to move the bypass valve between the first and second positions.

Further illustratively according to this aspect of the invention, the bypass valve includes a bypass valve member and a seat. The bypass valve member and seat are relatively movable to move the bypass valve between the first position and the second position. A flag is coupled to the bypass valve member to indicate the position of the bypass valve.

Additionally illustratively according to this aspect of the invention, the bypass structure includes a seal to prevent fluid flow around the bypass valve. A vent passageway extends between a surface of the body and the bypass valve to indicate when the seal is leaking.

Illustratively according to this aspect of the invention, the bypass structure includes a first component for providing a flow of fluid to the bypass structure and a second component for receiving a flow of fluid from the bypass structure. The entry passageway includes a first port and the exit passageway includes a second port. The first component includes an output port having a complementary configuration to the first port. The second component includes an input port having a complementary configuration to the second port. The bypass structure includes means for maintaining the output port and the first port in fluid tight engagement and the input port and the second port in fluid tight engagement.

According to yet another aspect of the invention, a fluid regulating assembly includes a pressure regulator and a body. The body includes a fluid entry passageway communicating fluid from a fluid supply source to the pressure regulator and a fluid exit passageway communicating fluid from the pressure regulator to an exit port. The fluid regulating assembly includes means for diverting a portion of the fluid from the pressure regulator.

Illustratively according to this aspect of the invention, the diverting means has a first condition blocking fluid flow through the diverting means and a second condition permitting fluid flow through the diverting means.

Additionally illustratively according to this aspect of the invention, the fluid regulating assembly includes means for signaling the diverting means to change between the first and second conditions.

Further illustratively according to this aspect of the invention, the fluid regulating assembly includes means for indicating the condition of the diverting means.

BRIEF DESCRIPTION OF THE DRAWINGS

The invention may best be understood by referring to the following detailed description and accompanying drawings which illustrate the invention. In the drawings:

FIG. 2 illustrates a cross sectional view of the fluid pressure regulator assembly illustrated in FIG. 1, taken generally along section lines 2—2 of FIG. 1;

FIG. 3 illustrates a cross sectional view of the fluid pressure regulator assembly illustrated in FIGS. 1–2, taken generally along section lines 3, 5-3, 5 of FIG. 1;

FIG. 4 illustrates an exploded cross sectional view of certain details of the pressure regulator assembly illustrated in FIGS. 1–3;

DETAILED DESCRIPTION OF AN ILLUSTRATIVE EMBODIMENT

Figure 1:
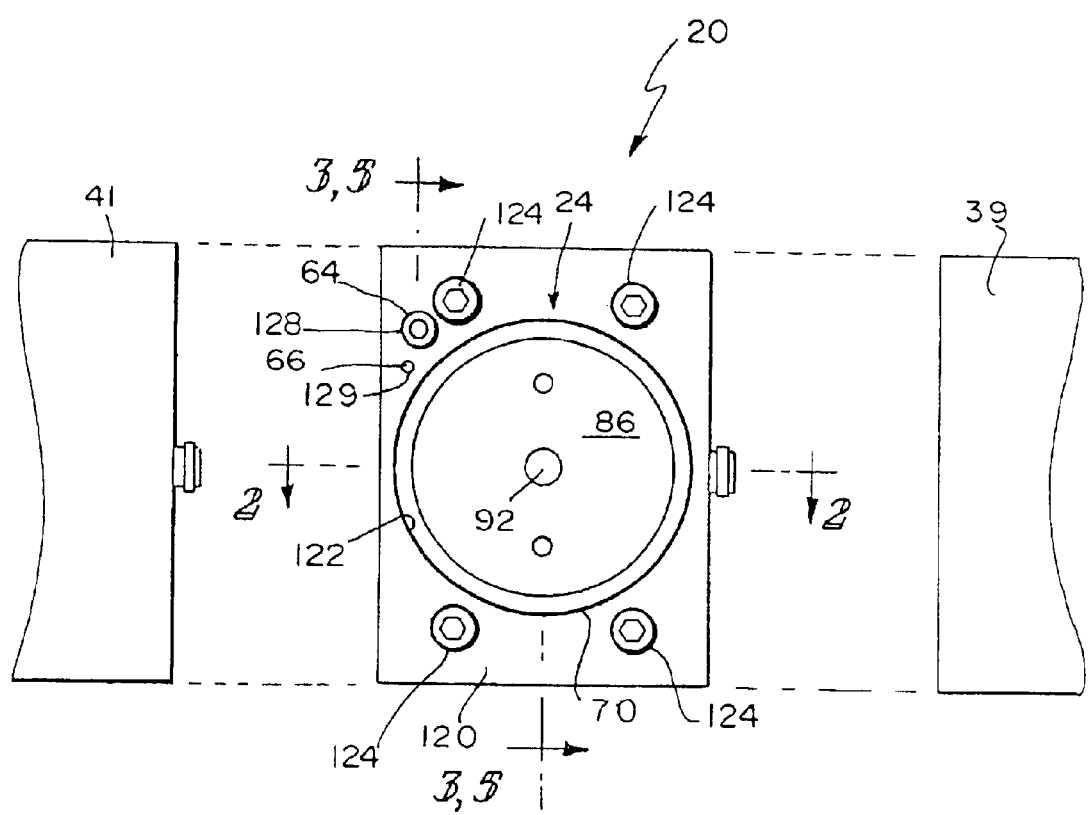
FIG. 1 illustrates top plan view of a fluid pressure regulator assembly according to the present invention, positioned between other components with which it may be used, illustrated fragmentarily.
Figure 5:
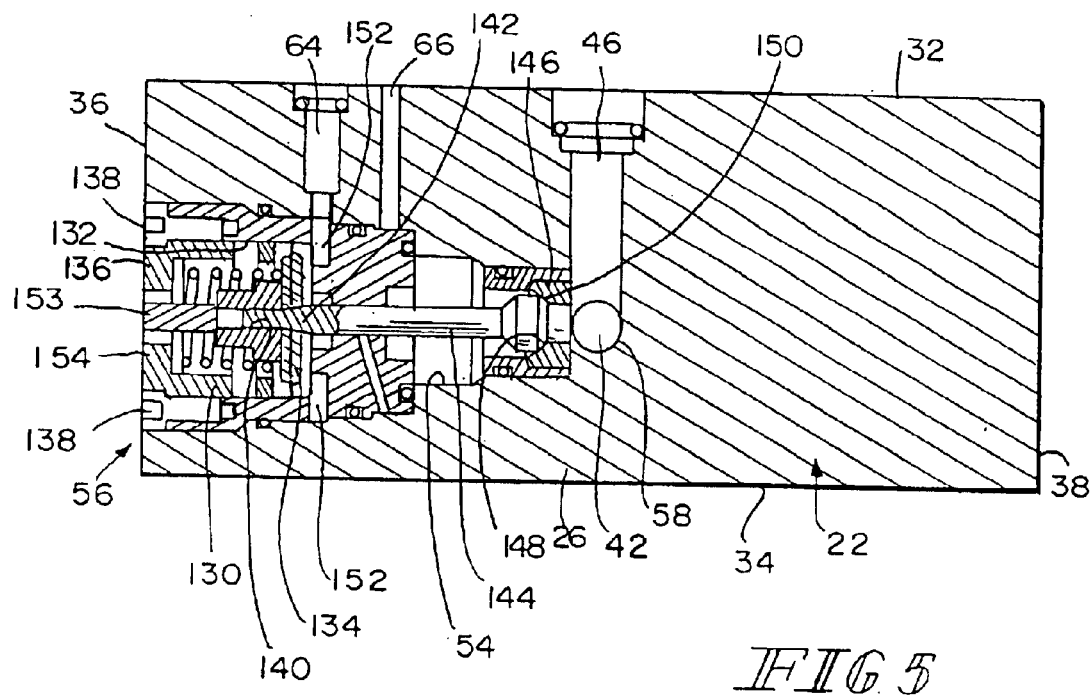
FIG. 5 illustrates an enlarged sectional view of certain details of the pressure regulator assembly illustrated in FIG. 3; and, FIG. 6 illustrates a perspective phantom view of certain details of the pressure regulator illustrated in FIGS. 1–3.
Figure 6:
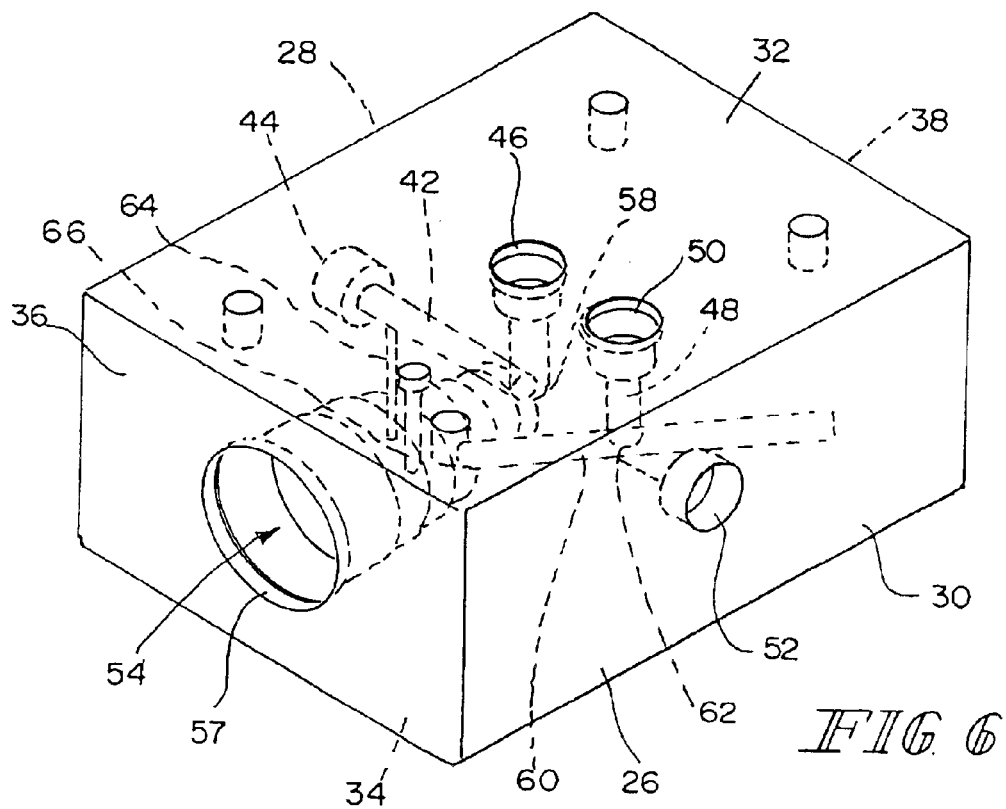

The fluid regulator assembly 20 includes a fluid regulator body assembly 22 (FIGS. 2, 3 and 5) and a fluid pressure regulator 24 FIGS. 1–3). The fluid regulator body assembly 22 includes a generally rectangular prism shaped body 26 (FIGS. 2, 3, 5 and 6) including opposite side walls 28, 30, opposite top 32 and bottom 34 walls and opposite end walls 36, 38, each of which is generally rectangular. Each of the opposite side walls 28, 30 includes two longitudinally extending spaced, parallel grooves 40 (FIG. 2) which aid in the mounting of assembly 20 on a color changer, such as the ITW Ransburg model MCV 78011 series of color changers available from ITW Automotive Finishing Group, 48152 West Road, Wixom, Michigan 48393. In this regard, the disclosure of the ITW Ransburg Electrostatic Systems MCV Series Modular Color Changer Model(s): 78011-XX service manual is hereby incorporated herein by reference. In a color changer of the type described in ITW Ransburg Electrostatic Systems MCV Series Modular Color Changer Model(s): 78011-XX service manual, fluid regulator assembly 20 typically will be oriented between, for example, a two-, four-, or eight-color block assembly 39 and a flow meter block assembly 41, both illustrated diagrammatically in FIG. 1. Each groove 40 is somewhat inverted T-shaped in configuration transverse to its longitudinal extent.

The fluid regulator body 26 includes a substantially right-angle fluid entry passageway 42 (FIGS. 2 and 6) having an entry port 44 on sidewall 28 between grooves 40 and an exit port 46 at about the center of top wall 32. The fluid regulator body 26 also includes a substantially right-angle regulated fluid exit passageway 48 having an entry port 50 offset from the center of top wall 32 and an exit port 52 on sidewall 30 between grooves 40. The fluid regulator body 26 also includes a passageway 54 (FIGS. 3, 5 and 6) for receiving a bypass valve assembly 56.

Bypass passageway 54 includes an opening 57 in end wall 36, and extends inward from opening 57, intersecting fluid entry passageway 42 at about the location of the right angle 58 in passageway 42. The fluid regulator body 26 also includes an obliquely extending bypass passageway 60 which intersects bypass passageway 54 and regulated fluid exit passageway 48 at about the location of the right angle 62 in passageway 48. Finally, fluid regulator body 26 includes a passageway 64 for the introduction into bypass valve assembly 56 of a control fluid signal, illustratively a compressed air bypass signal, to bypass some fluid around regulator 24, and a vent passageway 66 for venting regulated fluid to indicate that (a) seal(s) in the bypass valve assembly 56 is (are) leaking, indicating that the bypass valve assembly is in need of service. Passageways 64, 66 extend from top wall 32 and intersect passageway 54.

The fluid pressure regulator 24 includes a generally right circular cylindrical body 70 (FIGS. 1–4) having a radially extending flange 72 adjacent its end wall 74. Body 70 includes a passageway 76 including a port 78 located generally centrally on end wall 74 for the entry of fluid, liquid coating material in this example, the pressure of which is to be regulated. Body 70 also includes a passageway 80 including a port 82 offset from the center of end wall 74 for the exit of fluid, the pressure of which is regulated by the action of regulator 24. An outlet port 83 at the other end of passageway 80 supplies fluid at regulated pressure to, for example, (a) coating material atomizing and dispensing device(s).

The other end 84 of body 70 is closed by a threaded cap 86 which engages threads 88 provided on the inside wall of a flange 90 adjacent end 84. Cap 86 includes a central port 92 for a control fluid pressure signal, in this example a compressed air signal at a pressure sufficient to provide the desired output coating material pressure at port 52. When they are assembled, the body 70 and cap 86 define a cavity which is divided by a diaphragm 94 (FIGS. 2–3) into a regulating fluid, here compressed air, chamber 96 and a regulated fluid, here liquid coating material, chamber 98.

The signal applied at port 92 is coupled through openings in a support spacer 99 to chamber 96. Diaphragm 94 is formed from a resilient material which is relatively inert to the regulating fluid and the regulated fluid. Diaphragm 94 includes a regulating fluid side support 100 and a regulated fluid side support 102 coupled together by a screw 104 which extends through openings in both of supports 100, 102 and diaphragm 94. Diaphragm 94 and spacer 99 are clamped between body 70 and cap 86 when body 70 and cap 86 are assembled with the perimeters of diaphragm 94 and spacer 99 oriented between them. The end 106 of the screw 104 projects into working relation with a valve closure 108 of a valve 110. The valve closure 108 of valve 110 is normally biased by a spring 112 against a seat 114 to prevent backflow of the regulated pressure fluid from chamber 98 into port 46. The output of the regulator 24 is thus the regulated pressure fluid at a pressure determined by the regulating fluid pressure at port 92, and generally within a pound per square inch ($lb/in^2$, $6.895 \times 10^3$ $Nt/m^2$ in mks units) or so of the pneumatic signal at port 92.

The fluid regulator body assembly 22 and fluid pressure regulator 24 are coupled together by a fluid regulator top plate 120 (FIGS. 1–3) having a central opening 122 big enough to accommodate body 70, but not big enough to pass flange 72, so that flange 72 is captured between plate 120 and top wall 32 when plate 120 is placed over fluid pressure regulator 24 and attached to fluid regulator body assembly 22 by, for example, cap screws 124. Appropriate fluid couplers 126 (FIGS. 2–3) are positioned in ports 46 and 50 prior to this assembly step to aid in alignment of ports 46, 78 and 82, 50. Appropriate O-ring seals can be provided on couplers 126 and in ports 44, 46, 50, 52, 78, 82, 83, 92 and seats 114, 146 as necessary. Plate 120 includes a passageway 128 (FIG. 1) which communicates with passageway 64 to permit the bypass valve 56 control signal to pass from a source of this signal through to bypass valve 56. Plate 120 also includes a passageway 129 which communicates with passageway 66 to permit the detection of coating material which leaks by seal 131 on valve assembly 56.

Turning now to bypass valve assembly 56, it includes a valve body 130 (FIGS. 3 and 5) defining a cylinder 132. A valve piston 134 is captured within cylinder 132 by a closure 136 which is coupled to valve body 130 by, for example cap screws 138. A spring captured between closure 136 and piston 134 urges piston 134 away from closure 136. Piston 134 includes a socket 140 for receiving an end 142 of a valve closure, or needle, 144. A valve seat 146 including a complementary seat surface 148 to a surface 150 of the other end of needle 144 is oriented at the end of passageway 54 adjacent its intersection with passageway 42, so that the position of needle 144 away from or against seat 146 determines whether fluid flows or does not flow through bypass passageways 54, 60 between ports 44, 52, or instead must flow through regulator 24 to get from port 44 to port 52.

Cylinder 132 is coupled to passageway 64 via ports 152 provided in cylinder 132 above piston 134. The position of valve 56, that is, whether it is bypassing fluid introduced at port 44 to port 52, or whether all of that fluid introduced at port 44 is flowing through regulator 24 to get to port 52, is indicated visually by a flag 153 provided on piston 134. If the flag 153 is protruding through an opening 154 in the end of closure 136, valve 56 is bypassing fluid. If it is not, then bypass valve 56 is closed and all of the fluid exiting from port 52 is being regulated by regulator 24.

An advantage of this configuration, with separate regulator body 26 and regulator 24, is that it permits the regulator module 24 to be removed from the regulator body 26, replaced with another regulator 24, and taken to a remote location for servicing. This means that the regulator 24 does not need to be disassembled in the coating application area when the regulator 24 requires servicing.

What is claimed is:

1. A fluid pressure regulator assembly including a body having first, second and third surfaces, the body including a housing, a first passageway extending from a first port provided in the first surface to a second port provided in the third surface, a second passageway extending from a third port provided in the third surface to a fourth port provided in the second surface, a bypass valve in the housing, a third passageway extending from the first passageway to the housing, a fourth passageway extending from the housing to the second passageway, the bypass valve controlling flow from the first passageway through the third passageway and the fourth passageway to the second passageway in response to a bypass control signal coupled to the bypass valve, and a pressure regulator including a fifth control port for receiving a fluid pressure signal, a sixth port in fluid communication with the second port and a seventh port in fluid communication with the third port to control the pressure of fluid flowing from the second port to the third port.

2. The apparatus of claim 1 wherein the body is generally right rectangular prism shaped.

3. The apparatus of claim 1 wherein the first passageway includes a generally right angle turn.

4. The apparatus of claim 3 wherein the second passageway includes a generally right angle turn.

5. The apparatus of claim 1 wherein the second passageway includes a generally right angle turn.

6. The apparatus of claim 1 further including a first component for providing a flow of fluid to the fluid pressure regulator assembly, and a second component for receiving a flow of fluid from the fluid pressure regulator assembly, the first component having an output port having a complementary configuration to the first port, the second component having an input port having a complementary configuration to the fourth port, and means for maintaining the first component and the pressure regulator assembly in an orientation in which the output port and the first port are coupled in fluid tight engagement and the second component and the pressure regulator assembly in an orientation in which the input port and the fourth port are coupled in fluid tight engagement.

7. The apparatus of claim 1 wherein the body includes a fifth passageway extending from the housing to one of the first, second and third surfaces.

8. The apparatus of claim 6 wherein the bypass valve includes a movable valve member and a seat, the movable member and seat having a first relative orientation to close the bypass valve and a second relative orientation to open the bypass valve, the apparatus further including an indicator coupled to the movable member and visible when the movable member is in one of the first and second orientations to indicate the condition of the bypass valve.

* * * * *